United States Patent
Huang et al.

(10) Patent No.: US 12,552,595 B1
(45) Date of Patent: Feb. 17, 2026

(54) SQUEEZE PUMP

(71) Applicant: ANHUI JND PLASTIC PACKAGING Co., LTD., Huainan (CN)

(72) Inventors: Yixin Huang, Huainan (CN); Xinrui Zhang, Huainan (CN)

(73) Assignee: ANHUI JND PLASTIC PACKAGING Co., LTD., Huainan (CN)

(*) Notice: Subject to any disclaimer, the term of this patent is extended or adjusted under 35 U.S.C. 154(b) by 0 days.

(21) Appl. No.: 19/052,410

(22) Filed: Feb. 13, 2025

Related U.S. Application Data (63) Continuation of application No. PCT/CN2024/118461, filed on Sep. 12, 2024.

(30) Foreign Application Priority Data

Aug. 19, 2024 (CN) .......................... 202411138505.4

(51) Int. Cl.
  *B65D 83/76* (2025.01)
  *B65D 37/00* (2006.01)

(52) U.S. Cl.
  CPC .......... *B65D 83/765* (2025.01); *B65D 37/00* (2013.01)

(58) Field of Classification Search
  CPC ............................. B65D 37/00; B65D 83/765
  See application file for complete search history.

(56) References Cited

U.S. PATENT DOCUMENTS

| | | | |
|---|---|---|---|
| 5,584,409 A * | 12/1996 | Chemberlen | B65D 77/225 220/373 |
| 6,234,360 B1 * | 5/2001 | Bockmann | B65D 83/765 222/327 |
| 6,581,803 B1 * | 6/2003 | Yoshimoto | B65D 1/0215 222/481.5 |
| 9,149,823 B2 * | 10/2015 | Decottignies | B65D 83/765 |
| 2003/0035597 A1 * | 2/2003 | Buckingham | F16K 15/144 383/103 |

(Continued)

FOREIGN PATENT DOCUMENTS

| | | | |
|---|---|---|---|
| CN | 1657370 A | 8/2005 |
| CN | 1699120 A | 11/2005 |

(Continued)

OTHER PUBLICATIONS

International Search Report received in corresponding International Patent Application No. PCT/CN2024/118461, mailed Apr. 10, 2025, 16 pages.

*Primary Examiner* — Jeremy Carroll (74) *Attorney, Agent, or Firm* — Cooper Legal Group, LLC (57) ABSTRACT

A squeeze pump includes a container body with an elastic deformability, and an accommodation cavity is formed inside the container body, a piston slidably provided inside the accommodation cavity and in a sealing fit with the container body, where the piston is configured to divide the accommodation cavity into a medium cavity and a gas cavity that do not communicate with each other, the medium cavity is configured to accommodate a pasty substance, and the medium cavity is in communication with a paste outlet, and a one-way inlet valve in communication with the gas cavity and configured to control that air enters into the gas cavity in one direction and avoid an escape of the air from the gas cavity.

5 Claims, 8 Drawing Sheets

(56) References Cited

U.S. PATENT DOCUMENTS

| | | | | |
|---|---|---|---|---|
| 2005/0189377 | A1* | 9/2005 | Lanzendorfer | A61Q 19/00 |
| | | | | 222/1 |
| 2006/0097014 | A1* | 5/2006 | Von Schuckmann | ............... |
| | | | | B65D 83/765 |
| | | | | 222/321.9 |
| 2007/0151987 | A1* | 7/2007 | Arghyris | B05B 11/00442 |
| | | | | 222/105 |
| 2009/0169693 | A1* | 7/2009 | Hoffman | F16K 15/144 |
| | | | | 137/859 |
| 2010/0155431 | A1* | 6/2010 | Bartolucci | B05B 11/028 |
| | | | | 222/389 |
| 2011/0056993 | A1* | 3/2011 | Lee | B05B 11/1077 |
| | | | | 222/321.6 |
| 2020/0031536 | A1* | 1/2020 | D'Agostino | B65D 47/2031 |

FOREIGN PATENT DOCUMENTS

| | | | |
|---|---|---|---|
| CN | 103213747 | A | 7/2013 |
| CN | 108249025 | A | 7/2018 |
| CN | 115818007 | A | 3/2023 |
| KR | 101331846 | B1 | 12/2013 |

* cited by examiner

SQUEEZE PUMP

CROSS-REFERENCE TO RELATED APPLICATION

This application continuation-in-part of PCT application serial no. PCT/CN2024/118461, filed on Sep. 12, 2024, which claims the priority and benefit of Chinese patent application serial no. 202411138505.4, filed on Aug. 19, 2024. The entireties of PCT application serial no. PCT/CN2024/118461 and Chinese patent application serial no. 202411138505.4 are hereby incorporated by reference herein and made a part of this specification.

TECHNICAL FIELD

The present application relates to a technical field of containers, and in particular, relates to a squeeze pump.

BACKGROUND ART

With the improvement of living standards of people, a demand for daily care products such as toothpaste, hand cream, sunscreen, and ointment is gradually increasing. The daily care products mentioned above are mostly semi-solid liquids, commonly referred to pasty substance or pasty agent, etc. Currently, the pasty substance is generally packaged in soft tubes, with one end having a paste outlet and the other end having a fishtail sealing structure. The soft tube is deformed when being squeezed, so as to extrude the pasty substance out of the paste outlet for use.

As the pasty substance decreases, the paste may move around inside the soft tube chaotically when the soft tube is squeezed with one hand, which often requires two hands to push the paste near the tail end of the soft tube towards the paste outlet, which is less convenient to use. Moreover, as the pasty substance gradually decreases with daily use, it becomes increasingly troublesome to squeeze out remaining pasty substance.

SUMMARY

In order to improve the convenience for squeezing out pasty substance from a container, the present application provides a squeeze pump, by means of which the pasty substance may be squeezed out with only one hand, and the pasty substance will not wander in the container, with advantages of convenient use, simple structure, and low cost.

The squeeze pump provided in the present application adopts the following technical solution.

A squeeze pump includes:
a container body with an elastic deformability, and an accommodation cavity is formed inside the container body,
a piston, the piston is slidably provided inside the accommodation cavity and in a sealing fit with the container body, the piston is configured to divide the accommodation cavity into a medium cavity and a gas cavity that do not communicate with each other, the medium cavity is configured to accommodate a pasty substance, and the medium cavity is in communication with a paste outlet, and
a one-way inlet valve in communication with the gas cavity and configured to control that air enters into the gas cavity in one direction and avoid an escape of the air from the gas cavity.

By adopting the above technical solution, by squeezing the part of the container body in the medium cavity or gas cavity, the pasty substance may be squeezed out from the paste outlet, meanwhile the piston slides correspondingly in the accommodation cavity. As the pasty substance decreases, the piston gradually approaches the paste outlet to keep the remaining pasty substance in the medium cavity and not move freely in the accommodation cavity. Even if there is less pasty substance left, it may be squeezed out with one hand and used as needed, without the need to find a position of the paste in a container with two hands or adjust the squeezing mode due to changes in the amount of the pasty substance, greatly improving the convenience for squeezing out the pasty substance.

Optionally, the piston has the elastic deformability as a whole.

By adopting the above technical solution, during a deformation of the container body, the piston undergoes a corresponding deformation to ensure the sealing effect between the piston and the container body, so that even if a user squeezes a part where the piston is located, the pasty substance may be squeezed out normally, so that a user may squeeze any part of the container body to squeeze out the content therein, thereby improving the use convenience.

Optionally, the piston includes a piston body and a sealing sleeve, the sealing sleeve is sleeved over the piston body and attached to an inner wall of the accommodation cavity in a sealing manner, a first end of the sealing sleeve is connected to the piston body, and a second end of the sealing sleeve extends in a direction to the paste outlet.

By adopting the above technical solution, the sealing sleeve continuously abuts against the inner wall of the accommodation cavity to ensure the sealing performance of the piston, and sealing sleeves of different extension lengths may be provided according to characteristics of the pasty substance to improve the adaptability of the container.

Optionally, a gap is formed between the sealing sleeve and the piston body, and the sealing sleeve has the elastic deformability.

By adopting the above technical solution, when the container body is deformed under an external force, the sealing sleeve is correspondingly deformed under a compression of the container body, to maintain the fit between the sealing sleeve and an inner wall of the medium cavity during a deformation and restoration of the container body, avoiding formation of a clearance, and thus improving a sealing effect.

Optionally, the sealing sleeve gradually expands in the direction to the paste outlet.

By adopting the above technical solution, the sealing sleeve has a tendency to expand outward, which enables the sealing sleeve to be more stably attached to the inner wall of the accommodation cavity, thereby improving the sealing effect.

Optionally, the piston body has the elastic deformability, a gas gathering groove is formed on a side of the piston body facing the gas cavity, a groove opening of the gas gathering groove faces the gas cavity, and a groove bottom is located at a part of the piston body facing the medium cavity.

By adopting the above technical solution, when the container body is undergoing a deformation or a restoration, air applies pressure to an inner wall of the gas gathering groove due to the pressure difference, which, on one hand, is used to drive the piston to move as a whole, and on an other hand, may expand the piston body outward to improve the fit between the sealing sleeve and the inner wall of the accommodation cavity, thereby further improving the sealing effect, and thus reducing the leakage possibility of the pasty substance.

Optionally, the piston further includes a connecting ring with the elastic deformability, the connecting ring is annular, the connecting ring constitutes an inner annular connecting end and an outer annular connecting end, the inner annular connecting end is attached to the piston body, and the outer annular connecting end is attached to the sealing sleeve.

By adopting the above technical solution, the connecting ring, with its own elasticity, provides a certain support and deformation space for the sealing sleeve, which further improves the overall deformation ability of the piston, thereby enhancing the sealing effect of the sealing sleeve.

Optionally, the squeeze pump further includes a one-way medium valve at the paste outlet and in communication with the medium cavity, the one-way medium valve is configured to control a discharge of the pasty substance from the medium cavity and avoid a backflow of the pasty substance and the air to the medium cavity.

By adopting the above technical solution, the pasty substance or air may be effectively prevented from flowing back to the medium cavity by means of the one-way medium valve when the container body is released, thus optimizing the use experience.

Optionally, the one-way medium valve includes a valve body with the elastic deformability, a first end of the valve body is in communication with the medium cavity, a second end of the valve body is formed with an opening, the valve body has two sealing surfaces at the opening, the two sealing surfaces are attached to each other to close the opening when the valve body maintains an original shape, and the valve body gradually contracts inward in a direction to the opening.

By adopting the above technical solution, when squeezing the container body, the pasty substance pushes the two sealing surfaces apart from the inside out to open the opening. The valve body resets under its own elastic force after the container body is released, to close the opening and prevent the pasty substance or air from flowing back, so as to realize a rapid reaction with a simple structure.

Optionally, the two sealing surfaces attached to each other are taken as a group, a plurality of groups of sealing surfaces are provided, the plurality of groups of sealing surfaces are distributed radially and connected to each other, an angle between the two sealing surfaces of each of the plurality of groups of sealing surfaces is equal to an angle of the two sealing surface of a respective adjacent group of the plurality of groups of sealing surfaces.

By adopting the above technical solution, the plurality of groups of sealing surfaces work together to open or close the opening, which not only facilitates a formation of a larger opening, but also results in a faster response, making it easier to squeeze out the pasty substance and achieving a better check effect.

Optionally, an end of the valve body away from the medium cavity is configured as an arc-shaped end.

By adopting the above technical solution, residue of pasty substance may be effectively reduced with a smooth arc-shaped end, so as to reduce a waste of the pasty substance, such that a bottle body is cleaner, thus optimizing the use experience.

In summary, the present application includes at least one of the following beneficial technical effects:

1. By squeezing the part of the container body in the medium cavity or gas cavity, the pasty substance may be squeezed out from the paste outlet, meanwhile the piston slides correspondingly in the accommodation cavity. As the pasty substance decreases, the piston gradually approaches the paste outlet to keep the remaining pasty substance in the medium cavity and not move freely in the accommodation cavity. Even if there is less pasty substance left, it may be squeezed out with one hand and used as needed, without the need to find a position of the paste in a container with two hands or adjust the squeezing mode due to changes in the amount of the pasty substance, greatly improving the convenience of squeezing out the pasty substance.
2. The sealing effect between the piston and the container body may be ensured with the elastic deformability of the piston, so that even if a user squeezes a part where the piston is located, the pasty substance may be squeezed out normally, so that a user may squeeze any part of the container body to squeeze out the content therein, thereby improving the use convenience.
3. The air, on one hand, drives the piston to move as a whole, and on the other hand, may expand the piston body outward by means of the inner wall of the gas gathering groove, to improve the fit between the sealing sleeve and the inner wall of the accommodation cavity, thereby further improving the sealing effect, and thus reducing the leakage possibility of the pasty substance.

DETAILED DESCRIPTION

The present application is further described in detail below with reference to FIGS. 1-11.

Embodiment 1

Figure 1:
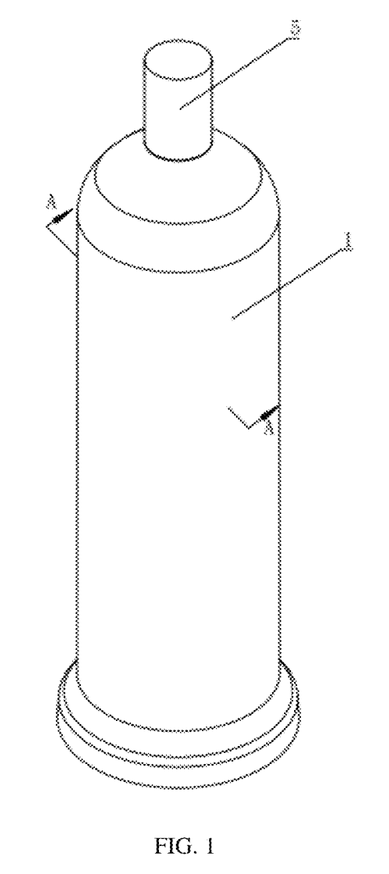
FIG. 1 is a general schematic structure view of Embodiment 1 according to the present application.
Figure 2:
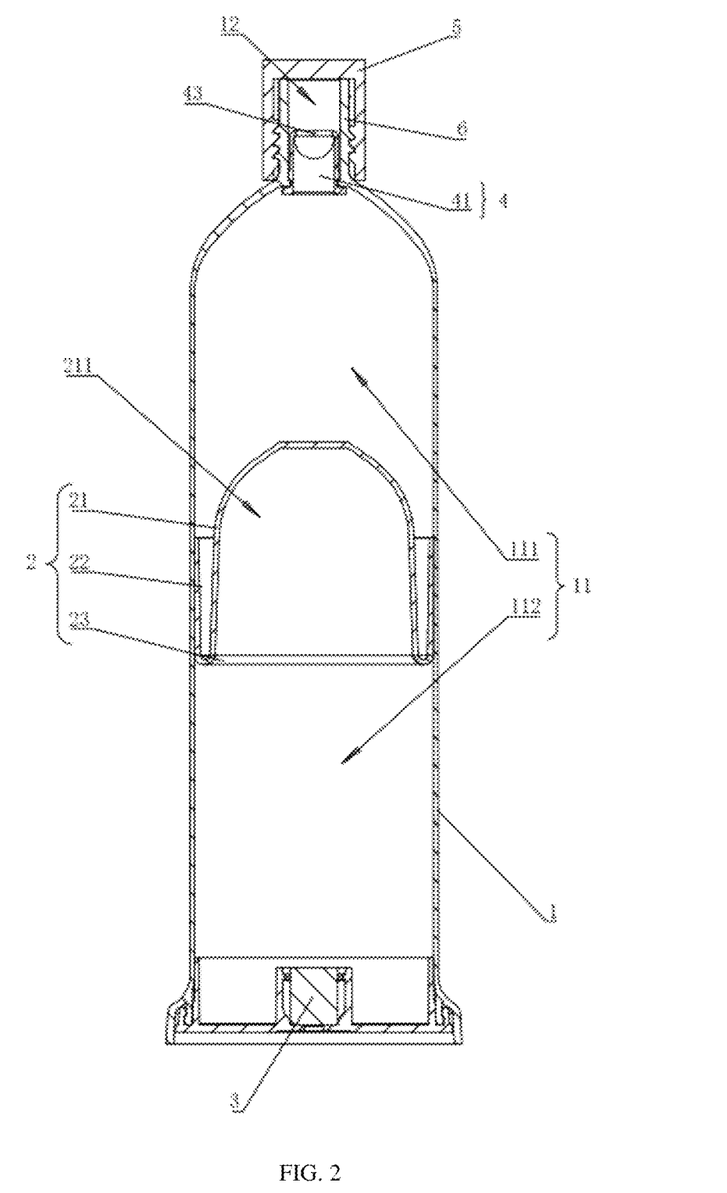
FIG. 2 is a cross-sectional view taken along a line A-A in FIG. 1.
Figure 3:
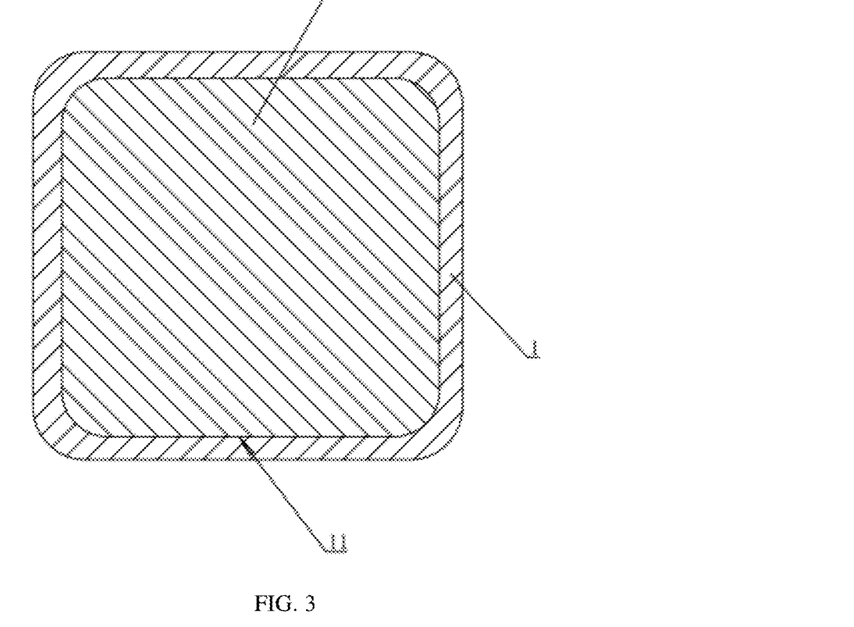
FIG. 3 is a cross section of other shape for showing an accommodation cavity.

Embodiment 1 of the present application discloses a squeeze pump, referring to FIGS. 1 and 2, including a container body 1 and a piston 2, an accommodation cavity 11 is formed inside the container body 1, and the piston 2 is slidably arranged inside the accommodation cavity 11, a periphery of the piston 2 abuts against an inner wall of the accommodation cavity 11, so as to be in a sealing fit with the container body 1.

The piston 2 divides the accommodation cavity 11 into a medium cavity 111 and a gas cavity 112, which do not communicate with each other. As the piston 2 slides inside the accommodation cavity 11, sizes of the medium cavity 111 and the gas cavity 112 change correspondingly. The medium cavity 111 is configured to accommodate pasty substance and is in communication with a paste outlet 12. The gas cavity 112 is provided with and in communication with a one-way inlet valve 3, and the one-way inlet valve 3 is configured to control that the air enters the gas cavity 112 in one direction and prevent the air from escaping out of the gas cavity 112.

Meanwhile, the container body 1 has an elastic deformability. "Elastic deformability" means that an object is deformed under an external force, and may return to its original shape when the external force is removed. That is to say, the container body 1 may withstand the squeeze of an external force, undergo contracted deformation to squeeze out the pasty substance in the medium cavity 111 through the paste outlet 12, and return to its original shape after the external force is removed.

The container body 1 with the elastic deformability mentioned above may be made of, but is not limit to, elastic materials such as rubber and plastic, or composite materials with elastic deformation ability such as carbon fiber reinforced plastic, however, the present application does not define specific material of the container body 1.

It should be noted that the position of the piston 2 in the accommodation cavity 11 varies with the amount of the pasty substance in the medium cavity 111. Therefore, when squeezing the container body 1, it is possible to squeeze a part of the container body 1 in the medium cavity 111 or a part of the container body 1 in the gas cavity 112, both methods may squeeze out the pasty substance, but the squeeze process is slightly different, as explained separately below.

When there is a larger amount of pasty substance inside the container body 1, the piston 2 is located on a side of the accommodation cavity 11 away from the paste outlet 12, and the medium cavity 111 occupies most of the accommodation cavity 11, in this case, it is easier to squeeze the part of the container body 1 in the medium cavity 111. When squeezing, the pasty substance is squeezed out from the paste outlet 12 under an external force, while the medium cavity 111 contracts. The container body 1 begins to recover after being released and the medium cavity 111 expands, however, a negative pressure will form in the medium cavity 111 due to a reduction of medium therein, so that a pressure difference is formed between the medium cavity 111 and the gas cavity 112. The piston 2 is forced to slide in a direction to the paste outlet 12 to reduce the medium cavity 111 under the air pressure. At the same time, the air enters the gas cavity 112 through the one-way inlet valve 3 until the container body 1 is completely stored, a pressure balance is maintained between the medium cavity 111, gas cavity 112, and the external atmosphere.

With daily use, the pasty substance inside the container body 1 gradually decreases. When the pasty substance is less, the piston 2 is located on a side of the accommodation cavity 11 close to the paste outlet 12, and the gas cavity 112 occupies most of the accommodation cavity 11, in this case, it is easier to squeeze the part of the container body 1 in the gas cavity 112. When squeezing, the gas cavity 112 contracts, and internal pressure therein increases (by means of the one-way inlet valve 3, the air inside the gas cavity 112 may not escape), so that a pressure difference is formed between the gas cavity 112 and the medium cavity 111. Due to the pressure difference, the gas cavity 112 has a tendency to expand, which then pushes the piston 2 to slide in the direction to the paste outlet 12, so as to squeeze out the pasty substance in the medium cavity 111 through the paste outlet 12. The container body 1 begins to recover after being released, the gas cavity 112 expands and the pressure therein drops, air enters the gas cavity 112 through the one-way inlet valve 3 to balance the pressure difference inside and outside of the gas cavity, until the container body 1 is completely restored.

In summary, the pasty substance may be squeezed out from the paste outlet 12 when the container body 1 is squeezed at any position, and during squeezing, the pasty substance always remains in the medium cavity 111, that is, always in the position of the accommodation cavity 11 close to the paste outlet 12 and will not move freely in the accommodation cavity 11. Even if there is less remaining pasty substance, it may be squeezed out with only one hand, greatly improving the convenience for squeezing out the pasty substance.

It should be noted that the pasty substance mentioned above may be, but is not limited to, a semi-solid substance between solid and liquid, such as toothpaste, hand cream, ointment, food paste, or industrial paste, however, the present application is not limited to a type, function, and efficacy of the pasty substance.

Furthermore, referring to FIG. 2, a paste outlet tube 6 may be provided at the paste outlet 12 of the container body 1, the past outlet tube 6 extends in a direction away from the container body 1. When the container body 1 is squeezed, the pasty substance flows out through the paste outlet tube 6 for use. The paste outlet tube 6 guides the pasty substance, allowing it to be squeezed in a strip form, which is more convenient for use. In addition, due to viscosity of the pasty substance, the pasty substance located inside the paste outlet tube 6 may seal the paste outlet tube 6 to some extent, preventing air or the extruded pasty substance from flowing back into the medium cavity 111, thereby optimizing user experience.

It should be noted that for the pasty substance with higher viscosity, a paste outlet tube 6 of a larger diameter may be provided to ensure that the pasty substance may be smoothly squeezed out, while for the pasty substance with relatively low viscosity, a paste outlet tube 6 of a smaller diameter may be provided, or a tube body of the paste outlet tube 6 may be elongated to ensure that the pasty substance forms an effective seal inside the paste outlet tube 6, to avoid a backflow.

Referring to FIGS. 1 and 2, the accommodation cavity 11 may be cylindrical with a circular or suborbicular cross-section in the present embodiment. A cylindrical structure is more conducive to maintaining the continuous fit between the piston 2 and the inner wall of the accommodation cavity 11 during the axial sliding, ensuring a sealing effect, while a circular or suborbicular cross-section is also conducive to maintaining a seal effect between the piston 2 and the inner wall of the accommodation cavity 11. In this embodiment, the design of the accommodation cavity 11 is only optional, in other embodiments, referring to FIG. 3, the cross-section may also be configured to have other smooth arc shapes, and the piston 2 is configured in a corresponding shape, however, the present application is not limited to the shape, size, etc. of the accommodation cavity 11.

Referring to FIG. 1, the container body 1 according to the present embodiment may have a flat bottom that facilitates an upright placement, allowing a medium container to stand upright for easy access when not in use. In addition, the shape of the container body 1 may be, but is not limited to, cylindrical, elliptical, square, rectangular, gourd shaped, etc., but the present application is not limited to the shape, size, or thickness of the container body 1.

Figure 4:
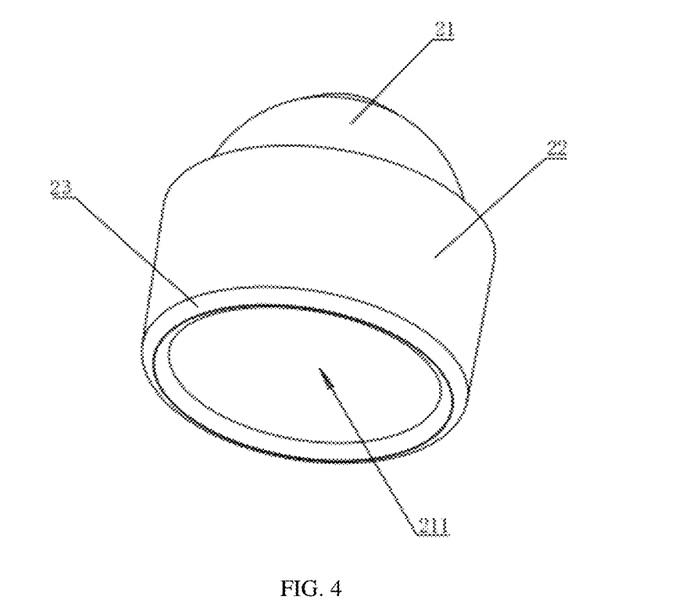
FIG. 4 schematically shows a piston of Embodiment 1 according to the present application.
Figure 5:
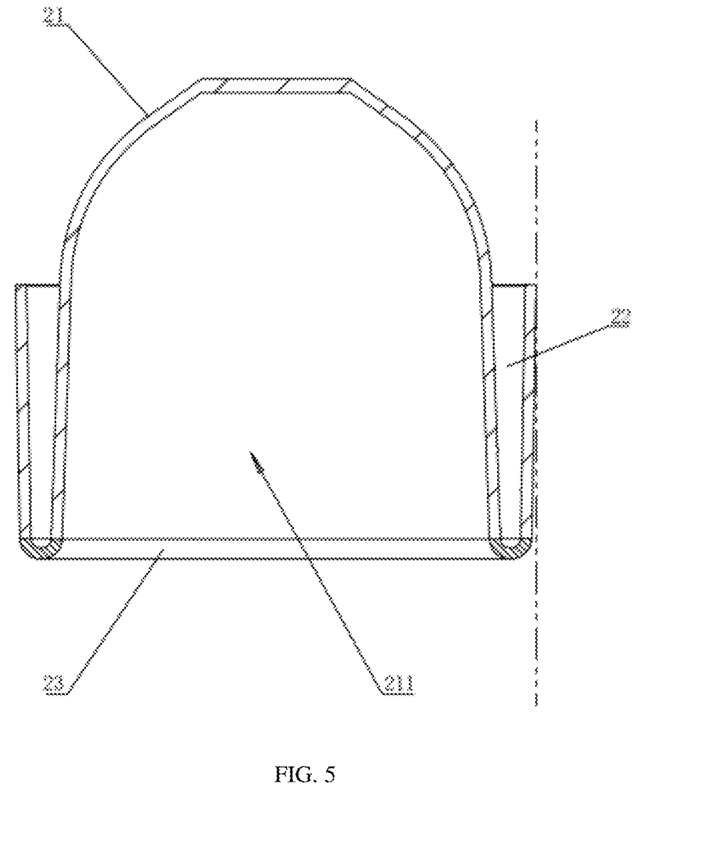
FIG. 5 is a cross-sectional view of the piston in FIG. 4.

Furthermore, referring to FIGS. 4 and 5, the piston 2 includes a piston body 21 and a sealing sleeve 22, the sealing sleeve 22 is cylindrical and is sleeved over the piston body 21, one end of the sealing sleeve 22 is attached to the circumference of the piston body 21 to form a tight connection, and the other end thereof extends in a direction towards the paste outlet 12, an entire outer circumference of the sealing sleeve 22 is continuously attached to the inner circumference of the accommodation cavity 11 to achieve a sealing effect, preventing the pasty substance from entering the gas cavity 112.

In the specific implementation, sealing sleeves 22 of different extension lengths may be provided according to characteristics of the pasty substance, for the flowable pasty substance, a longer sealing sleeve 22 may be provided to form a larger sealing surface 43 and ensure the sealing effect. However, the present application is not limited to the size or thickness of the sealing sleeve 22.

Furthermore, referring to FIGS. 4 and 5, the piston body 21 may gradually taper off to the paste outlet 12, thereby forming a certain gap between the piston body 21 and the sealing sleeve 22. Additionally, the sealing sleeve 22 may have the elastic deformability (the meaning of elastic deformability has been explained earlier and will not be repeated here, and the elastic deformability mentioned later also has this meaning). When the container body 1 deforms under an external force, the sealing sleeve 22 correspondingly deforms under the compression of the container body 1, to maintain the fit between the sealing sleeve with the inner wall of the medium cavity 111 during the deformation and restoration of the container body 1, avoiding formation of a clearance, and improving the sealing effect.

Furthermore, referring to FIG. 5, the sealing sleeve 22 may gradually expand towards the paste outlet 12. When the sealing sleeve 22 is placed in the accommodation cavity 11, the inner wall of the accommodation cavity 11 compresses the sealing sleeve 22, the sealing sleeve 22 has a tendency to expand outward due to its elasticity, which enables the sealing sleeve 22 to be more stably attached to the inner wall of the accommodation cavity 11, further improving the sealing effect.

Referring to FIGS. 4 and 5, the piston body 21 may have the elastic deformability, and the piston body 21 is configured with a gas gathering groove 211 on a side facing the gas cavity 112, a groove opening of the gas gathering groove 211 faces the gas cavity 112, and a groove bottom thereof is located at a part of the piston body 21 facing the medium cavity 111, so that the piston body 21 presents a structure of an approximately bowl shape.

When a pressure difference occurs between the gas cavity 112 and the medium cavity 111, the piston 2 slides inside the accommodation cavity 11, and the container body 1 is undergoing a deformation or a restoration, at this time, a possibility of the pasty substance entering the gas cavity 112 is the highest. At this time, the air applies pressure to an inner wall of the gas gathering groove 211 due to the pressure difference, which, on one hand, is used to push the piston 2 to move as a whole, and on the other hand, may expand the piston body 21 outward to improve the fit between the sealing sleeve 22 and the inner wall of the accommodation cavity 11, further improving the sealing effect and reducing the possibility of the leakage of the pasty substance.

Furthermore, referring to FIGS. 4 and 5, the piston 2 may further include a connecting ring 23 with the elastic deformability, the connecting ring 23 has an annular structure as a whole and a U-shaped cross-section, that is, one side of the connecting ring 23 has an arc surface and one side has a notch. An inner annular connecting end and an outer annular connecting end are formed at the U-shaped notch of the connecting ring 23, the inner annular connecting end is attached to the piston body 21, and the outer annular connecting end is attached to the sealing sleeve 22. The connecting ring 23, the piston body 21, and the sealing sleeve 22 form a tight seamless structure.

When the container body 1 undergoes a deformation or a restoration, a distance between the inner annular connecting end and the outer annular connecting end of the connecting ring 23 decreases, at the same time, the connecting ring, with its own elasticity, provides a certain support for the sealing sleeve 22, which further improves an overall deformability of the piston 2 and enhancing the sealing effect of the sealing sleeve 22.

At this point, the piston 2, as a whole, has the elastic deformability, so that the piston 2, during the deformation of the container body 1, undergoes a corresponding deformation to ensure the tightness between the piston 2 and the container body 1. When using the medium container of the present application, any part of the container body 1, including the part where the piston 2 is located, may be squeezed without adjusting the squeezing mode due to changes in the amount of the pasty substance, greatly improving the use convenience.

Furthermore, referring to FIGS. 2 and 4, an outer wall of the piston body 21 close to the paste outlet 12 is adapted to the inner wall of the accommodation cavity 11 at the paste outlet 12 in shape. When there is very little pasty substance left in the medium cavity 111, the part of the container body 1 in the gas cavity 112 may be squeezed, so that the piston 2 continues to slide towards the paste outlet 12 and is gradually attached to the inner wall of the accommodation cavity 11, in order to more thoroughly squeeze out the pasty substance in the medium cavity 111 and reduce residue.

Figure 6:
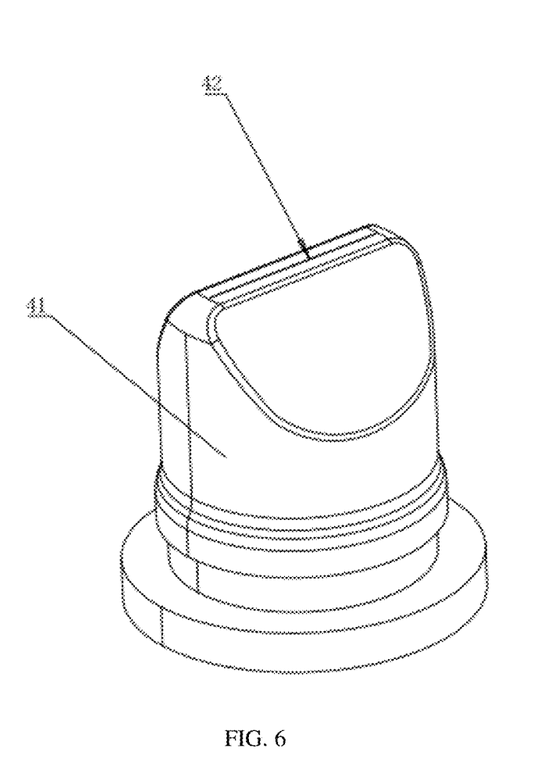
FIG. 6 schematically shows a one-way medium valve of Embodiment 1 according to the present application.

Referring to FIGS. 2 and 6, the container body 1 may be provided with a one-way medium valve 4 at the paste outlet 12, which is in communication with the medium cavity 111 and configured to control a discharge of the pasty substance from the medium cavity 111 while blocking the backflow of the pasty substance and air to the medium cavity 111. For the pasty substance with the viscosity similar to that of liquid, it is difficult to form an effective seal inside the paste outlet tube 6, which may cause backflow and affect the use experience. By using the non-return valve function of the one-way medium valve 4, the backflow may be effectively prevented even if the viscosity of the pasty substance is low.

It should be additionally noted that the one-way inlet valve 3 and the one-way medium valve 4 mentioned above may be designed as, but are not limited to, one-way valves or check valves such as one-way valves with spring or one-way valves with diaphragm, in which fluid medium may only flow in one direction and may not return. However, the present application is not limited to the type, size, and material of one-way valves. In addition, the one-way inlet valve 3 and the one-way medium valve 4 may be arranged on a side face or an end face of the container body 1, as long as they may communicate with corresponding cavities.

Figure 7:
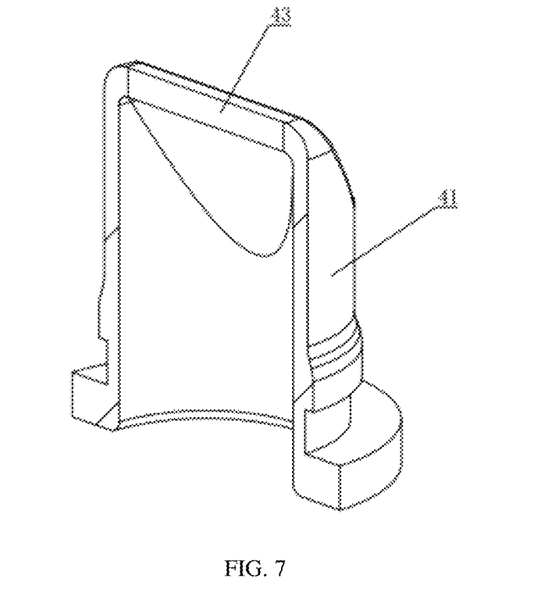
FIG. 7 is a schematic sectional view of the one-way medium valve in FIG. 6.

In Embodiment 1 or other embodiments, referring to FIGS. 6 and 7, the one-way medium valve 4 may include a valve body 41, one end of the valve body 41 is in communication with the medium cavity 111, and the other end thereof is configured with an opening 42, through which the pasty substance may enter the valve body 41 from the medium cavity 111 and eventually flow out through the opening 42. The valve body 41 has the elastic deformability, the valve body 41 has two sealing surfaces 43 at the opening 42, the two sealing surfaces 43 are attached to each other to close the opening 42 when the valve body 41 maintains its original shape. And the valve body 41 is formed with a tapered slope towards the opening 42, that is, the valve body 41 gradually contracts inward in the direction towards the opening 42 and forms a structure of an approximately fish tail.

When squeezing the container body 1, the pressure inside the medium cavity 111 increases, and the pasty substance pushes the two sealing surfaces 43 apart from the inside out, so as to open the opening 42 of the valve body 41, so that the pasty substance may flow out from the paste outlet 12. After releasing the container body 1, the sealing surfaces 43 are no longer squeezed by the pasty substance, the valve body 41 resets under its own elastic force, and the two sealing surfaces 43 are once again attached to each other to close the opening 42, so as to prevent the pasty substance or air from flowing back, while pinching off the pasty substance which flows out.

It should be additionally noted that when the pressure inside the medium cavity 111 is lower than external environment, the pasty substance or air will tend to flow back into the medium cavity 111, however, air in the environment exerts pressure on the circumference of the valve body 41 under the pressure difference, which further improves the fit between the two sealing surfaces 43, thereby completely closing the opening 42 and thus avoiding backflow.

Taking two sealing surfaces 43 attached to each other as a group, a plurality of groups of sealing surfaces 43 may be provided. The plurality of groups of sealing surfaces 43 are distributed radially and connected to each other, the plurality of groups of sealing surfaces 43 are simultaneously opened to open the opening 42 and attached to each other to close the opening 42. In order to optimize the coordination among the plurality of groups of sealing surfaces 43, an angle between the two sealing surfaces of one group of sealing surface is equal to that between the two sealing surfaces of the respective adjacent group of sealing surfaces 43.

Figure 8:
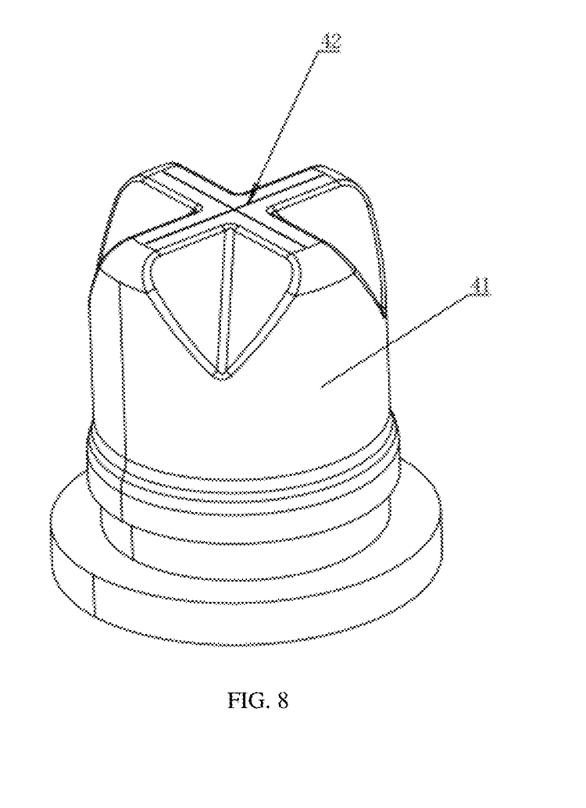
FIG. 8 is a schematic structure view of another embodiment of the one-way medium valve in Embodiment 1 according to the present application.

As an example, referring to FIG. 8, four groups of sealing surface 43 may be provided. when the opening 42 is closed, the angle of the two adjacent groups of sealing surfaces 43 is 90°, and the four groups of sealing surfaces 43 have a cross shaped structure as a whole. In other embodiments, a different number of groups of sealing surfaces may also be provided and the size of the angle is adjusted accordingly, but the present application is not limited to the number, arrangement, etc. of the sealing surfaces 43.

Referring to FIGS. 1 and 2, in order to prevent the pasty substance from being squeezed out accidentally, an end cap 5 may be provided at the paste outlet 12 of the container body 1, the end cap 5 is detachably connected to the container body 1, and is connected to the container body 1 to seal the paste outlet 12. In Embodiment 1, the end cap 5 may be connected with the container body 1 by, but are not limited to, screw connection, snap fit, or clamp connection, which is easy to disassemble and may withstand a larger pressure, however, the present application is not limited to a connection method between the end cap 5 and the container body 1.

The implementation principle of the squeeze pump disclosed in Embodiment 1 of the present application is as follows:

The end cap 5 is removed before use.

When squeezing a part of the container body 1 in the medium cavity 111, the medium cavity 111 contracts, and the pasty substance flows out of the paste outlet 12 through the one-way medium valve 4 under external pressure; when releasing the container body 1, the container body 1 begins to recover its shape, the medium cavity 111 expands and a negative pressure is formed, air enters the gas cavity 112 from the one-way inlet valve 3 under the pressure difference and pushes the piston 2 to slide towards the paste outlet 12 until the container body 1 is completely restored.

When squeezing the part of the container body 1 in the gas cavity 112, the gas cavity 112 contracts, the pressure increases, so that a pressure difference is formed between the gas cavity and the medium cavity 111, so as to push the piston 2 to slide towards the paste outlet 12, the piston 2 squeezes out the pasty substance from the paste outlet 12; after releasing the container body 1, the container body 1 begins to recover its shape, and the gas cavity 112 expands, air enters the gas cavity 112 from the one-way inlet valve 3 until the container body 1 is completely restored.

Additionally, the piston 2 has the elastic deformability, so that no matter how much pasty substance is left in the medium cavity 111, the pasty substance may be squeezed out when any part of the container body 1 is squeezed, including the part where the piston 2 is located, greatly improving the use convenience.

Embodiment 2

A difference between Embodiment 2 and Embodiment 1 is as follows.

Figure 9:
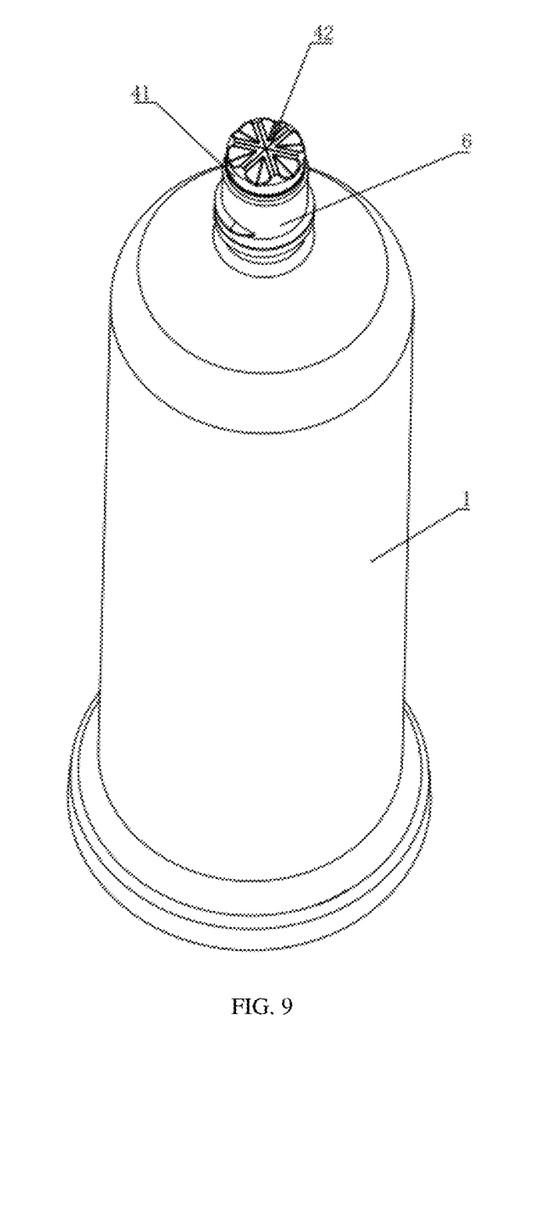
FIG. 9 schematically shows an installation position of the one-way medium valve of Embodiment 2 according to the present application.
Figure 10:
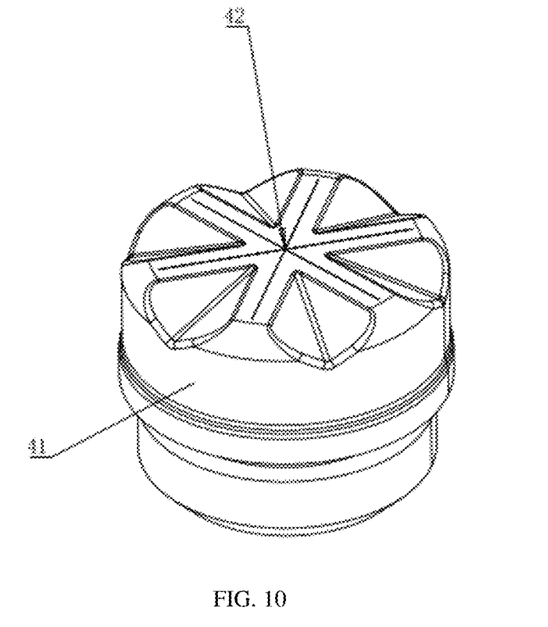
FIG. 10 schematically shows the one-way medium valve of Embodiment 2 according to the present application.

Referring to FIGS. 9 and 10, six groups of sealing surfaces 43 may be provided. When the opening 42 is closed, the angle between the two sealing surfaces of the two adjacent groups of sealing surfaces 43 is 60° to further facilitate an expansion of the opening 42. In addition, in Embodiment 2, one end of the one-way medium valve 4 away from the opening 42 is inserted into the paste outlet tube 6, and the other end thereof is located outside the paste outlet tube 6, that is, a part of the valve body 41 at the opening 42 is outside the paste outlet tube 6. When squeezing the container body 1, the paste outlet tube 6 will not restrict the deformation of the valve body 41, making it easier to squeeze out the paste.

It should be additionally noted that the one-way medium valve 4 may be connected with the paste outlet tube 6 by, but not limited to, screw connection, snap fit, or clamp connection, but the present application is not limited to the connection method between the two.

Embodiment 3

A difference between Embodiment 3 and Embodiments 1 and 2 lies in a shape of the valve body 41.

Figure 11:
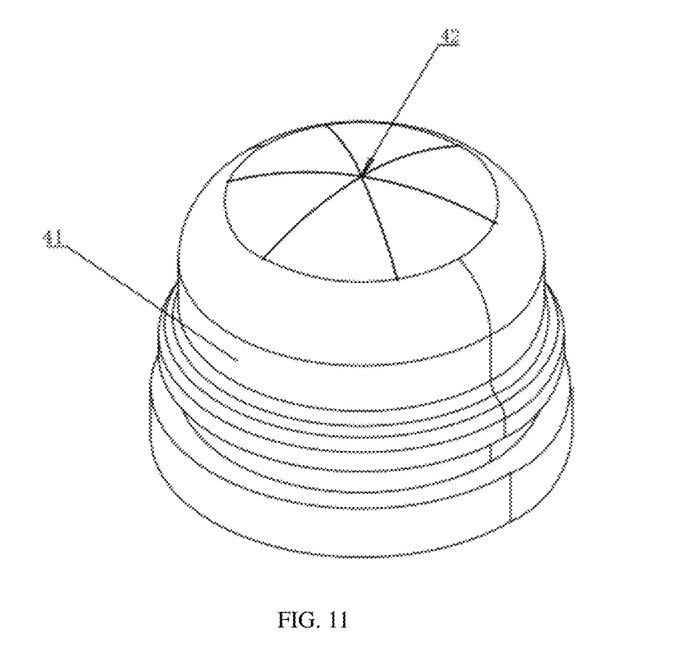
FIG. 11 is a schematic view showing the one-way medium valve of Embodiment 3 according to the present application.

Referring to FIG. 11, one end of the valve body 41 is inserted into the paste outlet tube 6, and the other end thereof extends away from the paste outlet tube 6 and gradually converges to form an arc-shaped end, so as to have an approximately U-shaped structure. The opening 42 is formed at the arc-shaped end. When the groups of sealing surfaces 43 are attached to each other, that is, when the opening 42 is closed, an outer wall of the arc-shaped end is smooth as an arc.

In Embodiment 3, six groups of sealing surfaces 43 are provided. When the opening 42 is closed, the angle between the two sealing surfaces of two adjacent groups of sealing surfaces 43 is 60°.

When in use, the pasty substance enters the valve body 41 from the paste outlet tube 6, as the container body 1 is further squeezed, the pasty substance forces the opening 42 at the arc-shaped end to open, and two sealing surfaces 43 of each group move departing from each other, so as to squeeze out the pasty substance from the opening 42 for use. After releasing the container body 1, the container body 1 and the valve body 41 are restored, the opening 42 is closed, and the two sealing surfaces 43 of each group abut against each other, thus realizing a seal effect.

The arc-shaped end is provided, so that the outer wall of the valve body 41 appear as a smooth structure, which may effectively reduce the residue of the pasty substance, so as to reduce a waste of the pasty substance while keeping a bottle body cleaner, further optimizing the user experience.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS 1 container body
11 accommodation cavity
111 medium cavity
112 gas cavity
12 paste outlet
2 piston
21 piston body
211 gas gathering groove
22 sealing sleeve
23 connecting ring
3 one-way inlet valve
4 one-way medium valve
41 valve body
42 opening
43 sealing surface
5 end cap
6 paste outlet tube

What is claimed is:

1. A squeeze pump, comprising:
a container body with an elastic deformability, wherein an accommodation cavity is formed inside the container body,
a piston slidably provided inside the accommodation cavity and in a sealing fit with the container body, wherein the piston is configured to divide the accommodation cavity into a medium cavity and a gas cavity that do not communicate with each other, the medium cavity is configured to accommodate a pasty substance, and the medium cavity is in communication with a paste outlet,
a one-way inlet valve in communication with the gas cavity and configured to control air to enter into the gas cavity in one direction and avoid an escape of the air from the gas cavity, and
a one-way medium valve at the paste outlet and in communication with the medium cavity,
wherein the piston comprises a piston body and a sealing sleeve, the sealing sleeve is sleeved over the piston body and attached to an inner wall of the accommodation cavity in a sealing manner, a first end of the sealing sleeve is connected to the piston body, and a second end of the sealing sleeve extends in a direction to the paste outlet,
wherein a gap is formed between the sealing sleeve and the piston body, and the sealing sleeve has the elastic deformability,
wherein the piston body has the elastic deformability, a gas gathering groove is formed on a side of the piston body facing the gas cavity, a groove opening of the gas gathering groove faces the gas cavity, and a groove bottom is located at a part of the piston body facing the medium cavity,
wherein the one-way medium valve is configured to control a discharge of the pasty substance from the medium cavity and avoid a backflow of the pasty substance and the air to the medium cavity,
wherein the one-way medium valve comprises a valve body with the elastic deformability, a first end of the valve body is in communication with the medium cavity, a second end of the valve body is formed with an opening, the valve body has two sealing surfaces at the opening, the two sealing surfaces are attached to each other to close the opening when the valve body maintains an original shape, and the valve body gradually contracts inward in a direction to the opening, and
wherein the two sealing surfaces attached to each other are taken as a group, a plurality of groups of sealing surfaces are provided, the plurality of groups of sealing surfaces are distributed radially and connected to each other, an angle between the two sealing surfaces of each of the plurality of groups of sealing surfaces is equal to an angle of the two sealing surfaces of a respective adjacent group of the plurality of groups of sealing surfaces.

2. The squeeze pump according to claim 1, wherein the piston has the elastic deformability as a whole.

3. The squeeze pump according to claim 1, wherein a diameter of the sealing sleeve increases gradually along the direction to the paste outlet.

4. The squeeze pump according to claim 1, wherein the piston further comprises a connecting ring with the elastic deformability, the connecting ring is annular, the connecting ring constitutes an inner annular connecting end and an outer annular connecting end, the inner annular connecting end is attached to the piston body, and the outer annular connecting end is attached to the sealing sleeve.

5. The squeeze pump according to claim 1, wherein an end of the valve body away from the medium cavity is configured as an arc-shaped end.

\* \* \* \* \*